US008850527B2

(12) United States Patent
Chew et al.

(10) Patent No.: US 8,850,527 B2
(45) Date of Patent: Sep. 30, 2014

(54) METHOD OF PERFORMING A SECURE APPLICATION IN AN NFC DEVICE

(75) Inventors: Gary Chew, Aix en Provence (FR); Charles Walton, Marshfield, MA (US)

(73) Assignee: Inside Secure, Aix-en-Provence, Cedex (FR)

( * ) Notice: Subject to any disclaimer, the term of this patent is extended or adjusted under 35 U.S.C. 154(b) by 349 days.

(21) Appl. No.: 13/178,043

(22) Filed: Jul. 7, 2011

(65) Prior Publication Data
US 2012/0011572 A1    Jan. 12, 2012

(30) Foreign Application Priority Data

Jul. 8, 2010 (FR) ...................... 10 02869

(51) Int. Cl.
| | | |
|---|---|---|
| G06F 7/04 | (2006.01) | |
| H04J 1/00 | (2006.01) | |
| H04L 9/32 | (2006.01) | |
| G06F 15/173 | (2006.01) | |
| H04W 12/06 | (2009.01) | |
| H04W 4/00 | (2009.01) | |
| H04L 29/06 | (2006.01) | |
| H04W 12/08 | (2009.01) | |

(52) U.S. Cl.
CPC .......... *H04L 63/0853* (2013.01); *H04W 12/06* (2013.01); *H04W 4/008* (2013.01); *H04W 4/00* (2013.01); *H04L 63/10* (2013.01); *H04W 12/08* (2013.01)
USPC ................ 726/4; 370/343; 713/171; 709/223

(58) Field of Classification Search
USPC .................... 705/2; 455/411; 726/4
See application file for complete search history.

(56) References Cited

U.S. PATENT DOCUMENTS

| | | | |
|---|---|---|---|
| 7,098,770 B2 | 8/2006 | Charrat et al. | |
| 7,280,518 B2 * | 10/2007 | Montano et al. | ............. 370/338 |

(Continued)

FOREIGN PATENT DOCUMENTS

| | | |
|---|---|---|
| EP | 1 327 222 A1 | 7/2003 |
| EP | 2007106 A1 | 12/2008 |
| FR | 2935510 A1 | 3/2010 |

OTHER PUBLICATIONS

FR Search Report and Written Opinion issued on Mar. 30, 2011 in FR Application No. FR 1002869.

(Continued)

*Primary Examiner* — Krista Zele
*Assistant Examiner* — Margishi Desai
(74) *Attorney, Agent, or Firm* — Panitch Schwarze Belisario & Nadel LLP (57) ABSTRACT

The invention relates to a method of executing a secure application in an NFC device, the method comprising steps during which: a contactless link is established between first and second NFC devices, the first NFC device transmits by the contactless link an identifier of a secure processor of the first NFC device, the second NFC device transmits by the contactless link an application identifier, the secure processor transmits by the contactless link first authentication data allowing the authentication of the secure processor of the first NFC device, the second NFC device transmits to an application server the first authentication data, the application server transmits to an authentication server the first authentication data and second authentication data) to authenticate the application and authorizes the two NFC devices to execute the application only if the secure processor and the application are authenticated.

22 Claims, 6 Drawing Sheets

(56) References Cited

U.S. PATENT DOCUMENTS

| | | | |
|---|---|---|---|
| 7,853,457 B2* | 12/2010 | Klabunde et al. | 705/2 |
| 8,170,532 B2* | 5/2012 | Wan et al. | 455/411 |
| 2005/0130626 A1* | 6/2005 | Inagaki | 455/411 |
| 2005/0160003 A1* | 7/2005 | Berardi et al. | 705/14 |
| 2005/0216344 A1* | 9/2005 | Collet et al. | 705/14 |
| 2008/0052091 A1* | 2/2008 | Vawter | 705/1 |
| 2008/0151847 A1* | 6/2008 | Abujbara | 370/338 |
| 2008/0219444 A1 | 9/2008 | Benteo et al. | |
| 2008/0270814 A1* | 10/2008 | Starr et al. | 713/323 |
| 2008/0272882 A1* | 11/2008 | Numao et al. | 340/5.8 |
| 2008/0313268 A1* | 12/2008 | Batalden et al. | 709/203 |
| 2009/0098825 A1* | 4/2009 | Huomo et al. | 455/41.1 |
| 2009/0170511 A1* | 7/2009 | Takei | 455/435.1 |
| 2009/0247077 A1* | 10/2009 | Sklovsky et al. | 455/41.1 |
| 2009/0247078 A1* | 10/2009 | Sklovsky et al. | 455/41.1 |
| 2010/0058463 A1 | 3/2010 | Bertin | |
| 2010/0075666 A1* | 3/2010 | Garner | 455/426.1 |
| 2010/0203870 A1* | 8/2010 | Hubinak et al. | 455/414.1 |
| 2010/0330904 A1* | 12/2010 | Stougaard | 455/41.1 |
| 2011/0029777 A1* | 2/2011 | Murakami et al. | 713/171 |
| 2011/0137773 A1* | 6/2011 | Davis et al. | 705/34 |
| 2012/0015665 A1* | 1/2012 | Farley et al. | 455/456.1 |

OTHER PUBLICATIONS

EP Search Report issued Nov. 30, 2011 in EP Application No. 11171946.4.

* cited by examiner

IDDB

| SEID | NID |
|---|---|
| ... | ... |
| ... | ... |
| ... | ... |
| ... | ... |

| NID | KIX |
|---|---|
| ... | ... |
| ... | ... |
| ... | ... |
| ... | ... |

| NID | APID |
|---|---|
| ... | ... |
| ... | ... |
| ... | ... |
| ... | ... |

Fig. 4A

UPDB

| NID | RFX |
|---|---|
| ... | ... |
| ... | ... |
| ... | ... |
| ... | ... |

| NID | PRFX | UPRF |
|---|---|---|
| ... | ... | ... |
| ... | ... | ... |
| ... | ... | ... |
| ... | ... | ... |

Fig. 4B

ARDB

| PVID | APID |
|---|---|
| ... | ... |
| ... | ... |
| ... | ... |
| ... | ... |

| APID | DRF | URL |
|---|---|---|
| ... | ... | ... |
| ... | ... | ... |
| ... | ... | ... |
| ... | ... | ... |

| PVID | KIX |
|---|---|
| ... | ... |
| ... | ... |
| ... | ... |
| ... | ... |

Fig. 4C

KYDB

| KIX | KEY |
|---|---|
| ... | ... |
| ... | ... |
| ... | ... |
| ... | ... |

METHOD OF PERFORMING A SECURE APPLICATION IN AN NFC DEVICE

BACKGROUND OF THE INVENTION

Embodiments of the present invention relate to the installation and the execution of a secure application in a portable device of the mobile telephone type or equivalent.

Embodiments of the present also relate to, but not exclusively, NFC (Near Field Communication) technology as well as architectures of NFC devices or NFC chipsets, that is to say sets of chips having at least one NFC component.

NFC technology is currently being developed by an industrial consortium grouped under the name "NFC Forum" (http://www.nfc-forum.org). NFC is derived from RFID (Radio Frequency Identification) technology and uses NFC controllers having several functioning modes, in particular a "Reader Mode," a "Card emulation" mode, and a "peer-to-peer" mode.

Important developments were made these past few years to integrate an NFC controller within portable objects of the mobile telephone type or equivalent (for example, Personal Digital Assistants (PDAs) equipped with a mobile telephone function). This integration in particular aims to endow such portable objects with a payment or access control (subway, bus, or the like) application, and other NFC technology applications such as reading tags or contactless electronic cards.

Figure 1:
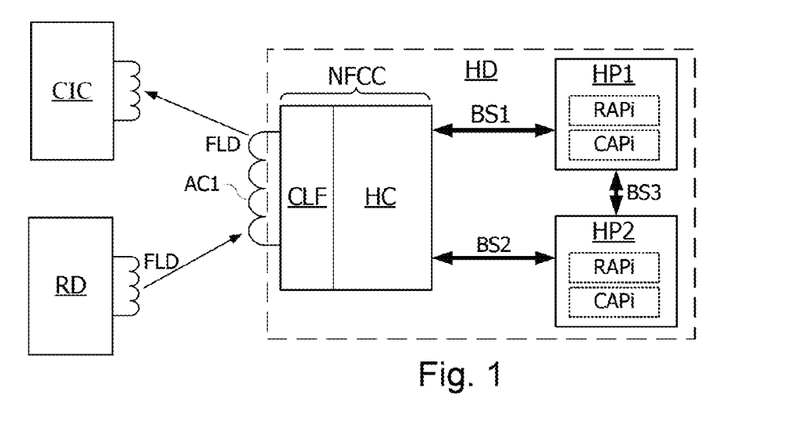
FIG. 1 schematically shows the architecture of a conventional NFC device.

FIG. 1 shows an NFC device of the handheld device HD type, such as a mobile telephone, a PDA, or the like. The device HD includes an NFC controller termed NFCC and at least one host processor HP1, HP2 linked to the controller NFCC by a bus BS1, for example, of the Single Wire Protocol SWP type. A host processor HP2 may be an integrated circuit card designated Universal Integrated Circuit Card UICC, for example of the Subscriber Identity Module SIM card type. A host processor HP1 may also be the baseband processor of a mobile telephone (that is, the processor in charge of telephonic communications). In this case, the host processor HP1 can be connected to the controller NFCC by way of an asynchronous link BS2 managed by Universal Asynchronous Receiver Transiter UART ports. The processor HP2 may also be directly linked to the processor HP1 by a bus BS3 of the type ISO 7816.

The resources of the controller NFCC are put at the disposition of the host processor HP1 to allow it to manage contactless applications RAPi, CAPi. The controller NFCC includes a host controller HC and a contactless interface CLF ("Contactless Front End Interface") equipped with an antenna coil AC1. In practice, the host controller HC and the interface CLF may be formed on a same semiconductor chip, such as the MicroRead® chip commercialized by the applicant, or be formed on two distinct chips, such as the chips "PicoRead® Microcontroller" and "PicoRead® RF Interface" commercialized by the applicant.

The interface CLF of the controller NFCC may generally function according to several RF technologies, for example "Type A" such as defined by ISO/IEC 14443 parts 2, 3, and 4; "Type B" such as defined by ISO/IEC 14443-2 with a standard framing such as defined by ISO/IEC 14443-3; "Type F" such as defined by ISO 18092 in passive mode at 212 and 424 ko/s (kilo octets per second); or by the Japanese Industrial standard JIS X 6319-4. Each RF technology, or contactless communication protocol, defines a frequency of emission of the magnetic field, a method of modulating the magnetic field to transmit data in active mode, a method of load modulation to transmit data in passive mode, a method of coding data, a data frame format, and the like.

Figure 2:
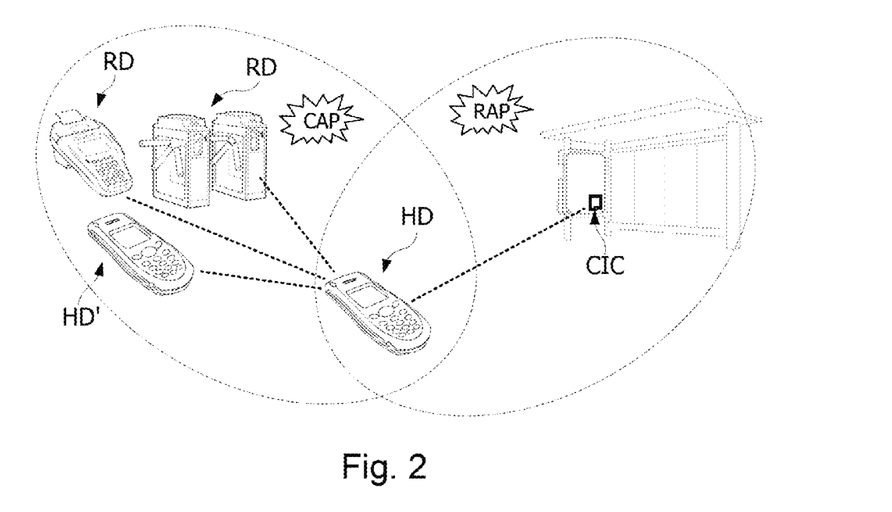
FIG. 2 schematically shows examples of applications implemented in the NFC device.

Application examples of the NFC device are shown in FIG. 2, which shows a handheld device HD equipped with the NFC device of FIG. 1, the device HD here having the form of a mobile telephone. Reader applications RAP and card applications CAP are distinguished below.

Reader Applications (RAP)

The controller NFCC functions like an NFC reader to conduct a transaction with a contactless integrated circuit CIC. A reader application RAPi is executed by the host processor HP1 (FIG. 1). The latter places the interface CLF in an active functioning mode where it emits a magnetic field FLD, sends data by modulation of the magnetic field, and receives data by load modulation and inductive coupling. This type of application may be free (for example reading a tag present at a bus stop containing the bus time schedule) and be executed by a non-secure processor. The host processor HP1 may, in this case, be the baseband processor of the mobile telephone. If it is a payment application, the host processor executing the application is preferably a secure processor, for example a SIM card processor, because the access to the services requires an identification/authentication of the subscriber.

Card Applications (CAP)

The functioning principle of the card emulation mode is described by European patent EP 1 327 222 (see also U.S. Pat. No. 7,098,770) in the name of the applicant. A card application CAPi is executed by the host processor HP1 (FIG. 1). The latter places the controller NFCC in a passive functioning mode and with the controller NFCC forms the equivalent of a contactless integrated circuit, which is seen by a reader RD as a contactless card. Thus, the controller NFCC does not emit a magnetic field, receives data by demodulating a magnetic field FLD emitted by the reader RD, and emits data by modulating the impedance of its antenna circuit AC1 (load modulation). The considered applications are generally payment or paying access control (payment terminal, subway entrance, or the like) applications. The handheld device HD is therefore used in this case like a chipcard. This type of application is generally secure and the host processor HP1, HP2 executing the application program is thus a secure processor, for example a SIM card processor, comprising cryptographic functions for the authentication of the user and/or the authentication of the portable device with respect to a transaction terminal.

Diverse NFC device architectures dedicated to telephony have been envisaged, some using the SIM card processor to manage the NFC applications and others providing a second secure processor. These two solutions may also be combined.

Due in particular to the large number of stakeholders and the complexity of relations between them, the implementation of a secure application in an NFC device raises difficulties that impede the commercial development of secure NFC applications. Indeed, the portable device, the secure processor, and the controller NFCC are produced by different manufacturers. The secure processor (SIM card) is generally given to the final user by a mobile network operator, after security information such as identifiers, secret keys, and certificates related to the user have been received. The portable device may be supplied to the final user by the mobile network operator or by another entity. The application is done by a software developer. If payment transactions are to be performed, the application is certified by a certification organization linked to a bank organization. A software component of an application, commonly called an "applet," is installed in a secure manner in the host secure processor and personalized with identification data of the user and of the portable device and with encryption keys specific to the application and to the user. The user is also referenced in a secure manner with a bank organization. A payment transaction also requires the intervention of a payment terminal produced by yet another manufacturer, and which also much be certified by a certification organization. The user of the payment terminal, a shopkeeper, must also be referenced in a secure manner with a bank organization. The mobile network operators are generally reticent to render the functions and security data of SIM cards accessible to others, such as suppliers of secure applications or of card payment services. It therefore results that the installation, requiring an authentication of the user, of an application in a portable device raises numerous difficulties. These difficulties appear each time an application must be installed, in particular in a secure processor of the portable device, and in particular when a user changes portable devices (mobile telephones) and must re-install the applications previously installed in an old portable device.

Moreover, faced with a small number of available applications, the manufacturers of mobile telephones do not see any benefit in increasing the prices of their telephones by integrating therein NFC controllers and, if necessary, supplementary secure processors.

It is therefore desired to have an NFC application deployment architecture that does not require the contribution of mobile network operators, all while offering a level of security compatible with payment and paying access control services. It is also desired that this architecture does not require the implementation of a centralized trusted server to ensure the management (emission, control, revocation) of secret data attributed to each mobile device for each application. It is also desired that each NFC application installed in a portable device is not attached to a particular portable device, but may be easily activated in another portable device. It is also desired that the supplier of an application may easily give the user access to the application, by minimizing the intervention of the user, and this without having to require the intervention of the mobile network operator or other entities.

BRIEF SUMMARY OF THE INVENTION

Embodiments of the invention relate to a method of executing a secure application in an NFC device, the method including establishment of a contactless link between a first NFC device and a second NFC device. The first NFC device transmits by the contactless link an identifier of a secure processor of the first NFC device. The second NFC device transmits by the contactless link an application identifier. The secure processor transmits by the contactless link first authentication data allowing the authentication of the secure processor of the first NFC device. The second NFC device transmits to an application server the first authentication data. The application server transmits to an authentication server the first authentication data and second authentication data allowing for the authentication of the application corresponding to the application identifier. The authentication server verifies the authentication data and authorizes the two NFC devices to execute the application only if the secure processor and the application are authenticated.

According to one embodiment, the first NFC device transmits to the authentication server an application installation request including an application identifier of an application to install and the first authentication data allowing the authentication of the secure processor of the first NFC device. The authentication server verifies the first authentication data, and if the secure processor is authenticated, transmits to the first NFC device an application download address. The first NFC device downloads the application from the received download address and installs the downloaded application.

According to one embodiment, after the installation of the application, the first NFC device informs the authentication server of the installation of the application by supplying thereto the identifier of the installed application and the first authentication data, and the authentication server verifies the first authentication data, and if the secure processor is authenticated, the authentication server stores the application identifier in association with the identifier of the secure processor of the first NFC device.

According to one embodiment, the authentication server does not transmit to the first NFC device an application download address if the application identifier is already stored in association with the identifier of the secure processor of the first NFC device.

According to one embodiment, the authentication server does not authorize the execution of the application by the two NFC devices if the application identifier is not stored in association with the identifier of the secure processor of the first NFC device.

According to one embodiment, the first authentication data includes the identifier of the secure processor and a first cryptogram calculated by the secure processor by applying a cryptographic calculation using a secret key stored by the secure processor to the identifier of the secure processor.

According to one embodiment, the second authentication data includes the identifier of the secure processor, the application identifier, and a second cryptogram calculated by the application server by applying a cryptographic calculation using a secret key specific to the application to the application identifier.

According to one embodiment, the second cryptogram is calculated by applying the cryptographic calculation to the application identifier and to the first cryptogram.

According to one embodiment, the first and/or the second cryptograms are calculated with the aid of a symmetric encryption algorithm using a secret key, or of an asymmetric encryption algorithm using a private key, or of a hashing function applied to the data to encrypt and to the secret key.

According to one embodiment, the verification of each of the first and second cryptograms is performed by recalculating the cryptogram from the same data and by using an encryption key accessible to the authentication server.

Embodiments of the invention also relate to a system for executing a secure application in an NFC device. A first NFC device includes an NFC component to establish a contactless communication with another NFC device, and a secure processor connected to the NFC component. A second NFC device is connected to an application server to execute an application with another NFC device. According to one embodiment, the system further includes an authentication server accessible to the application server and to the first NFC device, the system being configured to execute the method as disclosed above.

Embodiments of the invention also relate to an ensemble of a secure processor coupled to an NFC component configured to establish a contactless communication with an NFC device, the secure processor including a software component associated with a secure processor identifier, configured to establish a contactless communication with an NFC device by the intermediary of an NFC controller, and transmit by the contactless link an identifier; receive by the contactless link an application identifier; and transmit by the contactless link authentication data of the software component.

According to one embodiment, the software component is configured to verify whether the received application identifier figures or not in a list of applications stored by the secure processor.

According to one embodiment, the authentication data includes the secure processor identifier and a first cryptogram calculated by the secure processor by applying a cryptographic calculation using a secret key stored by the secure processor to the secure processor identifier.

According to one embodiment, the first cryptogram is calculated by the secure processor with the aid of a symmetric encryption algorithm using a secret key, or of an asymmetric encryption algorithm using a private key, or a hashing function applied to the data to encrypt and to the secret key.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 3:
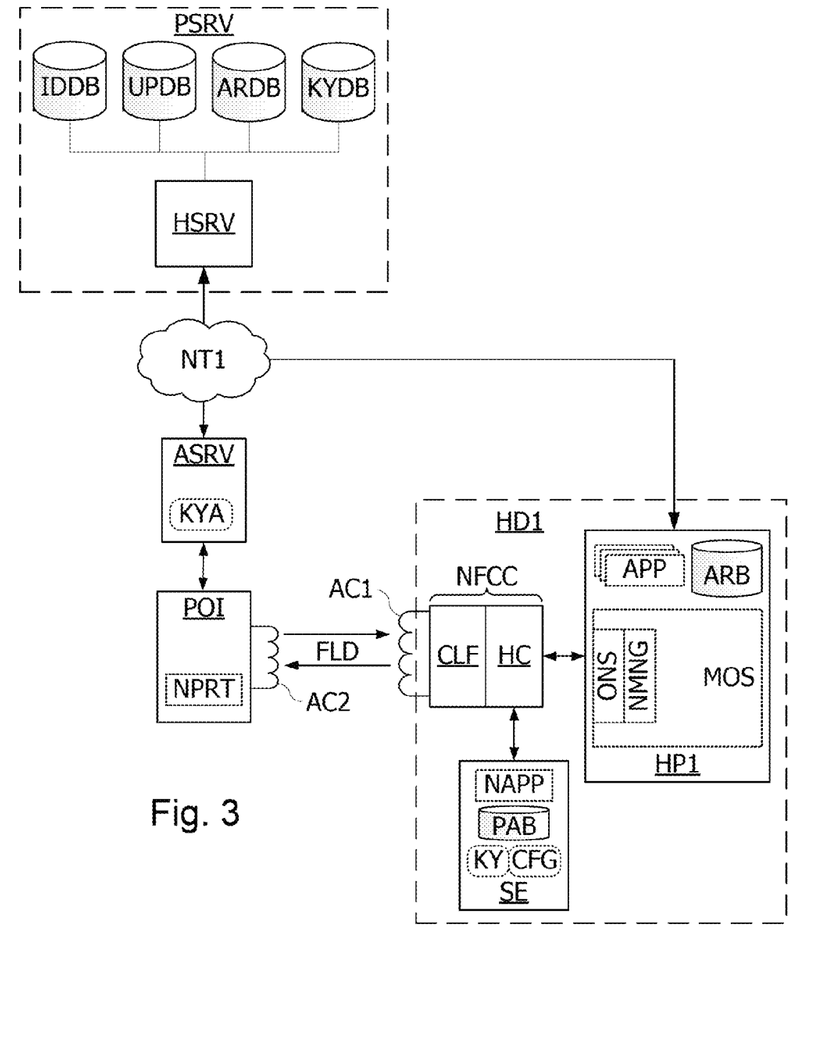
FIG. 3 schematically shows the architecture of an NFC application deployment system.

FIG. 3 shows the architecture of an NFC application deployment system. The deployment system includes a plurality of NFC portable devices HD and of interaction devices POI with which the devices HD may establish an NFC contactless communication. For reasons of simplicity, a single portable device HD1 and interactive device POI are shown in FIG. 3. The devices POI may be contactless NFC readers or contactless NFC integrated circuits. The devices POI are each connected or connectable to an application server ASRV allowing the execution of a transaction in the framework of an application, with a device HD1 connected to the device POI. The device POI includes an antenna AC2 to establish contactless NFC communications with an NFC device. The device POI may be connected to the server ASRV either directly, or else by the intermediary of one or more data transmission networks.

The device HD1 includes host processors HP1, SE and an NFC component referenced NFCC. The processor HP1 is for example a mobile telephone baseband processor, and the host processor SE is a secure processor. The component NFCC includes a host controller HC connected to processors HP1 and SE and an NFC interface circuit referenced CLF connected to an antenna circuit AC1. The processor HP1 includes an operating system MOS and can execute one or more applications APP installed in a memory of the processor HP1 (or accessible to the processor HP1). The processor SE may be the processor of a SIM card or a distinct processor having at least the minimum security level.

According to one embodiment, the operating system MOS includes a pilot software ONS allowing the processor HP1 to access certain functions of the processor SE by the intermediary of controller NFCC and to receive notifications emitted by the processor SE. The processor HP1 equally includes an application database ARB including references of secure applications APP installed in the memory of the processor HP1. The processor SE includes an application software component called "applet NAPP", an identifier of the processor SE, and an identifier of the component NAPP, encryption keys KY, a list PAB of identifiers of secure applications installed in the device HD1, and configuration data of the device HD1 (type of device, denomination and version of the operating system MOS, and the like). The secure applications APP may be payment applications, access control, and more generally, applications requiring an authentication. The software component NAPP may also store configuration information CFG of the device HD1, this information including, in particular, a type of device and a version number of the operating system MOS. The operating system MOS also includes a management software of applications to secure NMNG communicating with the software component NAPP by the intermediary of pilot ONS and of controller NFCC. The software NMNG is configured to collect configuration information of the device HD1, and to transmit it to the processor SE. The software NMNG is linked in a specific manner to the software component NAPP in a manner so as to mask the presence of the software component from other applications installed in the processor HP1. Thus, only the software NMNG is notified when the software component NAPP is solicited by the controller NFCC, by the intermediary of a contactless link established, to execute a secure application. The software NMNG also ensures a management function of the preferences of the user of the device HD1.

The application deployment system includes a database server HSRV giving access to one or more databases IDDB, UPDB, ARDB, KYDB. The software NMNG equally ensures an interface function between the server HSRV and the software component NAPP. The server HSRV manages identifiers of software components NAPP installed in the processors SE of devices HD1, identifiers of application suppliers, and supplies authentication services. During its fabrication, the processor SE of each device HD1 receives unique identifiers SEID and NID of processor SE and of software component NAPP, symmetric encryption secret keys and/or asymmetric encryption public and private keys associated with a certificate. The server HSRV ensures functions of saving and of deleting of users, of processors SE, of software components NAPP, of application suppliers, and of applications. Each application is thus identified by a unique application identifier.

Figure 4A:
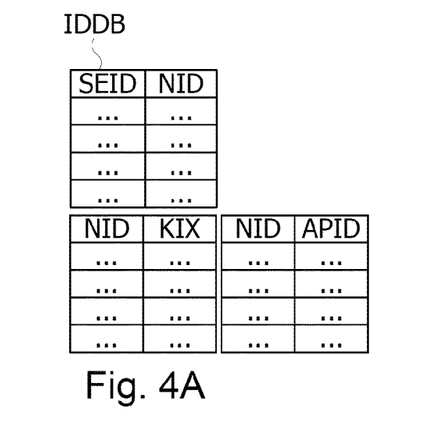
FIGS. 4A to 4D show tables of one or more databases used by the deployment system.

The contents of the one or more databases IDDB, UPDB, ARDB, KYDB are shown in FIGS. 4A to 4D. In FIG. 4A, the database IDDB is configured to establish a correspondence between identifiers SEID, NID of the processor SE and of the software component NAPP of each processor SE implemented in a device HD1. The database IDDB also establishes a correspondence between identifier NID and a key index KIX allowing access to associated encryption keys, stored by the processor SE. The database IDDB is thus filled in each time a processor SE is commissioned in a device HD1. The database IDDB also includes a correspondence table between identifiers of software components NID installed in a processor SE and of application identifiers APID, this table thus indicates whether an application having as identifier APID is installed in a device HD1 of which the software component NAPP corresponds to the identifier NID. The database IDDB is therefore equally updated each time an application is installed or removed from a device HD1.

Figure 4B:
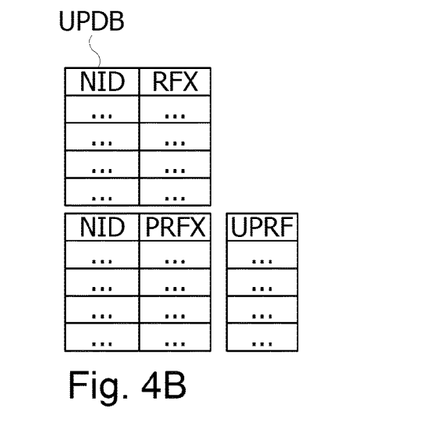

In FIG. 4B, the database UPDB is configured to establish a correspondence between identifier NID and a user reference RFX, a correspondence between identifier NID and an index PRFX referencing profile information UPRF relative to the user of the device HD1. The database UPDB is filled in during the installation of a first application in a device HD1, and is updated each time that the profile information of the user is modified.

Figure 4C:
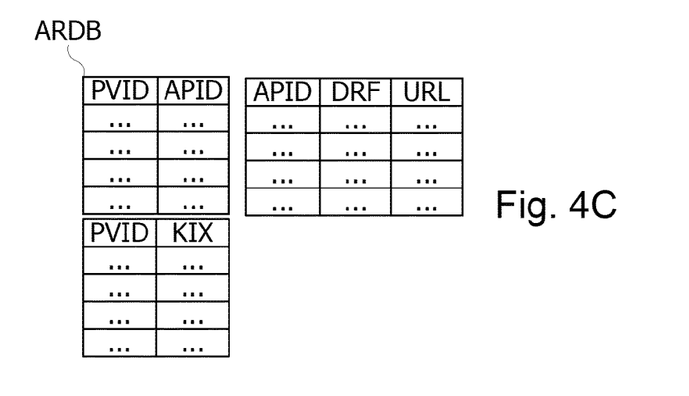

In FIG. 4C, the database ARDB is configured to establish a correspondence between application supplier identifiers PVID and of application identifiers APID for a type of device HD1, a correspondence between each identifier PVID and an encryption key index KIX allowing access to encryption keys KIX unique to the application supplier. The database ARDB also establishes a correspondence between each application identifier APID and a reference DRF of type of device HD1 in which the application may be installed and executed, and between each reference DRF and a download address URL of the application corresponding to the identifier APID. Each identifier APID thus allows for the identification of each instance of an application adapted to a type of device HD1 and to access a download address for the instance. The database ARDB is updated for each saving of a new application provided for a type of device HD1.

Figure 4D:
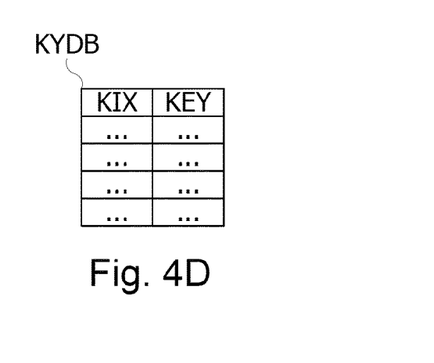

In FIG. 4D, the database KYDB is configured to establish a correspondence between each key index (of processor SE or of application supplier) and of encryption keys. Access to the database KYDB may be protected by a specific server configured to receive key indexes KIX and data to encrypt or to decrypt and to supply in response cryptograms resulting from the encryption or decryption of supplied data with the aid of keys referenced by the supplied key index KIX. The database KYDB is therefore modified at each commissioning of a new processor SE and at each saving of a new application for a type of device HD1.

Figure 5:
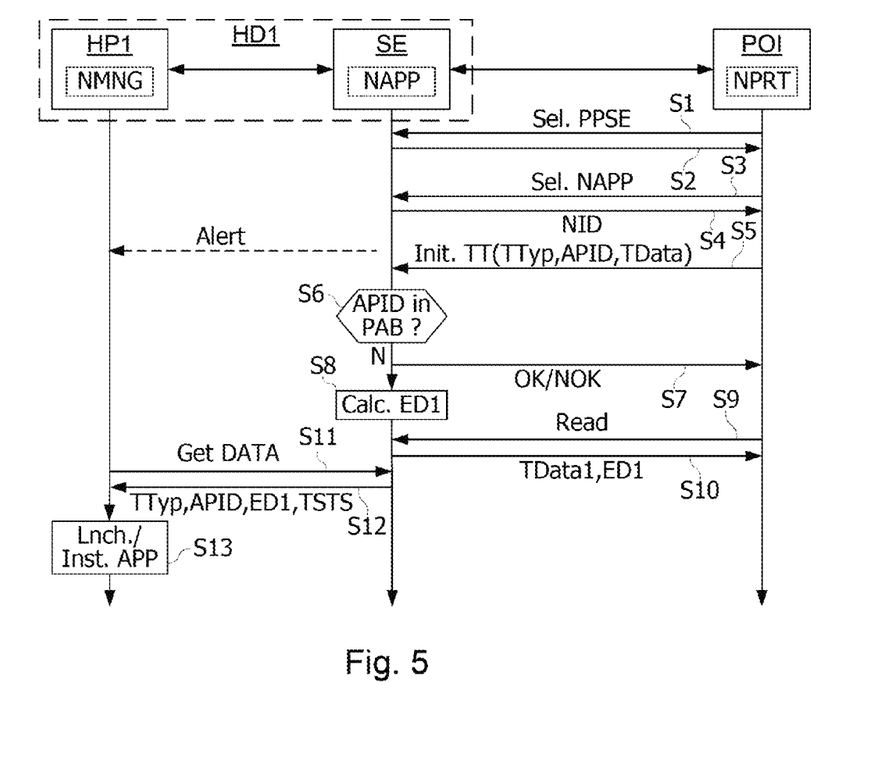
FIG. 5 shows steps, between a host secure processor of the NFC device and an NFC reader, of activating a transaction implicating the execution of an application, according to one embodiment.

FIG. 5 shows a sequence of steps S1 to S13 launched when a device HD1 is placed in contactless communication with a device POI. This sequence is executed by the software component NAPP installed in the processor SE of the device HD1 put in communication with the device POI by the intermediary of the controller NFCC, by a contactless reader software NPRT installed in the device POI and by the management software NMNG of the processor HP1.

At step S1, the software NPRT sends if necessary a selection message of a payment application PPSE (Proximity Payment System Environment) to the controller NFCC. The controller NFCC retransmits the message PPSE to the processor SE. At step S2, the processor SE responds to the selection message. At step S3, the reader software NPRT sends to the processor SE a selection message of the software component NAPP installed in the processor SE. Indeed, several other software components may be installed in the processor SE. At step S4, the software component NAPP responds to the software NPRT by supplying to it its identifier NID. At step S5, the device POI sends a transaction initialization message including an information of the transaction type TTyp, an application identifier APID, and transaction data Tdata. At step S6, the software component NAPP verifies whether the identifier APID figures or not in the list PAB of application identifiers installed in the processor HP1. At step S7, the software component NAPP responds to the initialization message by indicating whether the application APID is installed or not in the processor HP1. Whatever the response from the software component NAPP, the device POI executes step S9 where it emits a read command. In parallel, at step S8, the software component NAPP launches a cryptographic calculation to obtain a cryptogram ED1. Upon reception of the read command at step S9, the software component NAPP emits in response at step S10 the cryptogram ED1, as well as standard payment transaction data Tdata1 if the requested application is installed. It should be noted that steps S1 to S9 are preferably in conformance with the card payment standard EMV (Europay, MasterCard, Visa).

During steps S3 to S8, the software component NAPP emits an alert to the destination of the management software NMNG installed in the processor HP1, to inform it that it has been solicited by the intermediary of the controller NFCC. At step S11, the software NMNG transmits to the software component NAPP a data request message. At step S12, the software component NAPP transmits, in response to the software NMNG, the received transaction type TTyp, the application identifier APID, the cryptogram ED1, and a state information TSTS. At step S13, the software NMNG launches the application in the processor HP1 or an installation procedure of this application if it is not installed.

The cryptogram ED1 is for example calculated by applying a symmetric encryption cryptographic function such as AES (Advanced Encryption Standard) using a key stored by the processor SE, to the identifier NID, the application identifier APID, and possibly other data. The cryptogram ED1 may equally be calculated with the aid of a hashing function such as SHA (Secure Hash Algorithm) or MD5 (Message Digest 5) applied to the same data, as well as to the key stored by the processor SE. The cryptogram ED1 may also be calculated by an asymmetric encryption function using a private key stored by the processor SE, the corresponding public key being stored in the database KYDB. The other data used in the calculation of the cryptogram ED1 are transmitted therewith to allow its verification afterwards.

Figure 6:
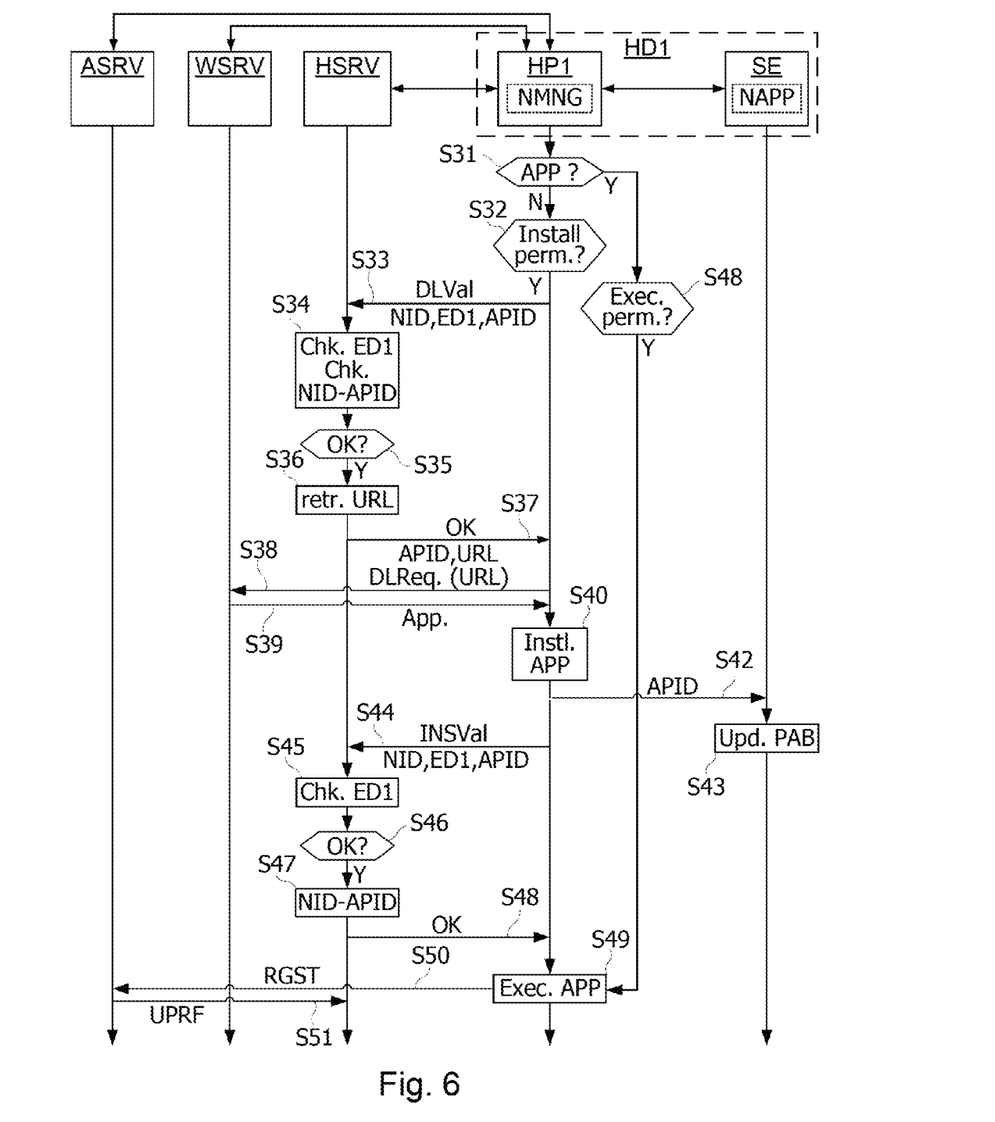
FIG. 6 shows steps of installation and of execution of an application in an NFC device, according to one embodiment.

FIG. 6 shows a sequence of steps S31 to S52 that may be executed at step S13 by the device HD1, and by the servers HSRV and ASRV. At step S31, software NMNG of processor HP1 determines whether the application having the identifier APID is installed in the device HD1 by consulting the database ARB. If the application is already installed, the processor HP1 executes step S48 where it may be provided to ask the user if he accepts to activate the application. If the user accepts to activate the application, the application is launched at step S49. If the application is not installed in the device HD1, the processor HP1 executes step S32 where it may be provided to ask the user if he accepts to install the application in the device HD1. If the user accepts to install the application, the processor HP1 emits a download validation request DLVal to the destination of the server HSRV, this request being accompanied by the identifier of the software component NID, the cryptogram ED1 calculate at step S7, and the application identifier APID to download. At step S34, the server HSRV receives this request, verifies the cryptogram ED1 with the aid of the identifier NID and of information contained in the databases IDDB, KYDB, and verifies the existence of the application identifier in the database ARDB. The server HSRV equally verifies that the application was not already installed in the device HD1 by verifying in the database IDDB that the identifier NID is not already linked to the application identifier APID. The verification of the link between the identifier NID and the application identifier may take into consideration the fact that the application being installed is an update of an application previously installed in the device HD1. In this case, the installation is authorized by the server HSRV. At step S35, if all these verifications are satisfied, the server HSRV executes step S36 where it determines a download address URL of the application by accessing the database ARDB with the aid of the identifier APID. At step S37, the server HSRV responds to the request DLVal by supplying the result of the verifications performed at step S34. If these verifications are satisfied, the server HSRV also transmits to the processor HP1 the download address URL of the application and possibly the application identifier APID. At the following steps S38 and S39, the processor HP1 receives this information from the server HSRV, and if the download is authorized by the server HSRV, proceeds with the downloading of the application by accessing a server WSRV at the received address URL. At step S40, the processor HP1 launches the installation of the application by executing the file downloaded at step S39. At step S42, the processor HP1 asks the processor SE, by the intermediary of the software component NAPP, to introduce the application identifier APID in the list of application identifiers PAB stored by the processor SE for each payment application. At step S43, the processor SE updates this list. Following step S42, the processor HP1 transmits to the server HSRV a validation request INSVal of the installation of the application containing the identifier NID, the cryptogram ED1, and the identifier APID of the installed application (step S44). At the next step S45, the server HSRV verifies the cryptogram ED1. If the cryptogram ED1 is correct (step S46), the server HSRV stores that the identifier NID is linked to the application identifier APID in the database IDDB (step S47). At the following step S48, if the cryptogram ED1 is correct, the server HSRV transmits to the processor HP1 an execution authorization message of the installed application. At the following step S49, the processor HP1 updates the database ARB by inserting therein the identifier APID of the installed application, and launches the execution of the application. During its execution by the processor HP1, the application can access the application server ASRV or an associated server (at step S50), which may request from the server HSRV information about the user profile UPRF stored in the database UPDB, on the basis of the identifier NID, and if necessary request the user to complete this information, for example by displaying a form to fill out on a display screen of the device HD1. The displayed form may be pre-filled with information already figuring in the database UPDB and relating to the user. The profile information entered by the user may be transmitted by the processor HP1 to a server linked to the application, such as the server ASRV or the server WSRV, which itself retransmits them to the server HSRV to update the database UPDB (step S51). During the execution of the application, the server ASRV may execute a conventional payment transaction by accessing a banking network on the basis of the user identification information obtained from the identifier NID in the database UPDB.

Procedures of blocking/unblocking and deinstalling an application may be put at the disposition of the user. These procedures are performed in a manner analogous to steps S33 to S37, step S33 being replaced by the emission of a corresponding request of blocking, unblocking, or deinstalling, and step S36 being replaced by a step of executing the request. To this end, an indicator of the block status may be provided, which may also be provided for each line of the table of the database IDDB associating an application identifier APID to an identifier NID of software component NAPP. If it is an application blocking or unblocking request, the server HSRV may update the status indicator corresponding to the application identifiers APID and software components NID received from the processor HP1. This status indicator may be tested before the processor HP1 executes the application at step S49. If it is a deinstallation request, the server HSRV may delete the line of this table associating the software component and application identifiers received from the processor HP1. Evidently, the application blocking/unblocking/deinstallation operations are not done until after a verification by the server HSRV of the cryptogram ED1 supplied by the processor HP1 and of the existence of a link between the identifiers NID and APID in the database IDDB.

Each element of list PAB stored in the processor SE may be associated with a priority number and a blocking indicator, accessible by a configuration command at the disposition of the user by the intermediary of processor HP1. In this manner, if several payment applications stored in the list PAD are compatible with the identifier APID transmitted by the device POI at step S5, the software component NAPP activates the non-blocked payment application having the highest priority number.

Figure 7:
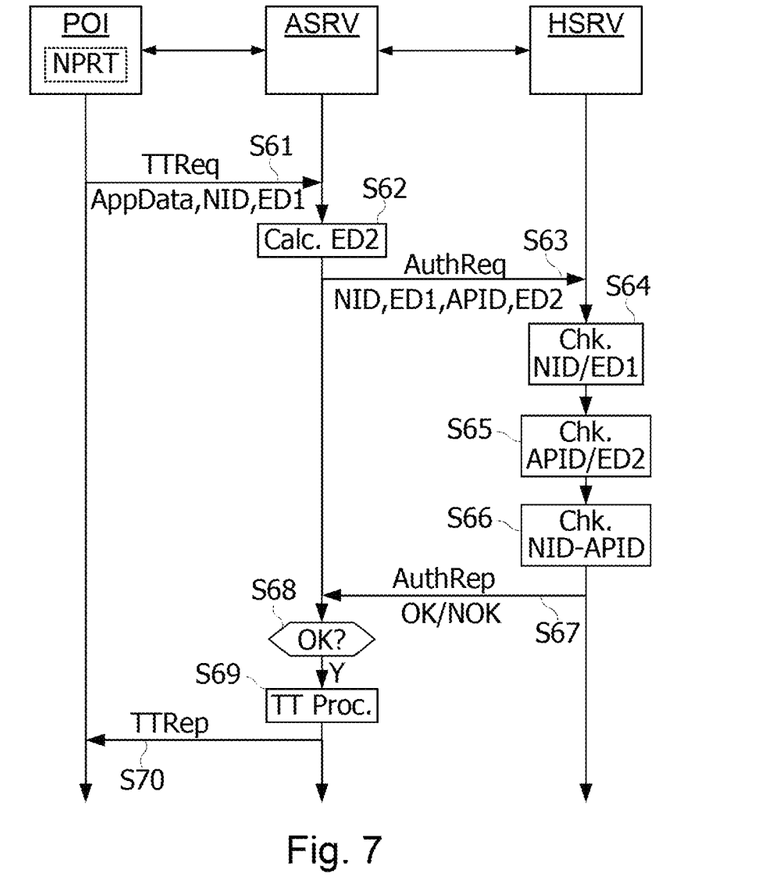
FIG. 7 shows steps of procedure of authorizing a transaction launched by an NFC interaction device during the execution of an application, according to one embodiment.

FIG. 7 shows a sequence of steps S61 to S70 that can be launched by the device POI upon start-up and during the execution of an application following steps S9 and S49 or of a payment application launched by the application activated at step S49. This sequence of steps is executed by the device POI, the application server ASRV and the server HSRV. At step S61, the device POI transmits to the server ASRV a transaction request TTReq containing data AppData relative to the application, the identifier of the software component NID received at step S4, and the cryptogram ED1 received at step S9. At step S62, the server ASRV receives this request and launches a cryptographic calculation to obtain a cryptogram ED2, in particular from the application identifier APID. At step S63, the server ASRV emits to the destination of the server HSRV, an authentication request AuthReq containing the identifier of the software component NID, the cryptogram ED1 and ED2, and the application identifier APID. At step S64, the server HSRV verifies the existence of the identifier NID in the database IDDB and verifies the cryptogram ED1. At step S65, the server HSRV verifies the existence of the application identifier APID in the database ARDB, and verifies the cryptogram ED2. At step S66, the server HSRV verifies in the database IDDB that the application is linked to the identifier NID of processor SE of device HD1 connected to device POI. At step S67, the server HSRV emits to the destination of server ASRV an authentication response message AuthRep indicating the success or failure of the authentication, that is to say whether the received cryptograms ED1, ED2 are authentic, and whether the application having identifier APID is really linked to the identifier NID of device HD1 connected to the device POI. At step S68, the server ASRV tests the authentication response message and if the authentication was successful, it executes steps S69 and S70 where it executes the transaction corresponding to the application and it transmits, to the device POI, a transaction response message TTRep to the request transmitted at step S61. The server ASRV may thus be assured of the authenticity of identifiers NID and APID.

The cryptogram ED2 may be calculated (at step 62) by applying the function used to calculate the cryptogram ED1 to the application identifier APID, and possibly to the cryptogram ED1 and to other data such as a randomly generated number. The other data used in the calculation of the cryptogram ED2, and in particular the random number are transmitted with the cryptogram ED2 to allow its verification by the server HSRV. If the cryptograms are calculated with the aid of a symmetric encryption or hashing function, using a secret key, the cryptograms ED1, ED2 may be verified by re-calculating them with the aid of the same secret keys and the same data used for their first calculation. The secret data are stored in the database KYDB in association with the identifiers NID, APID. The data that may be used for the calculation of the cryptogram ED1 may be found in the database IDDB in association with identifier NID. The data that may be used for the calculation of the cryptogram ED2 may be found in the database ARDB in association with identifier APID. If the cryptograms ED1, ED2 were calculated with the aid of an asymmetric encryption algorithm, they may be verified by applying to them the same encryption algorithm using public keys stored in the database KYDB, corresponding to the secret keys used for their calculation.

The authentication server HSRV may in reality be several servers connected between themselves. Thus, the database of encryption keys KYDB may be accessible by the intermediary of a specific server. The data of each of the databases IDDB, UPDB, ARDB, and KYDB may equally be split between several databases accessible by distinct servers.

Thanks to these dispositions, the installation of a new application does not require the installation of a software component in a secure processor SE of NFC device HD1. The secure processor SE is personalized only once and for all the NFC application susceptible of being executed by the processor HP1, by receiving the component NAPP associated with a unique identifier NID and one ore more associated secret keys. As a single software component NAPP may be installed in the processor SE, identifier NID may be used to identify the processor SE. The installation of the component NAPP in the processor SE does not at all prevent the installation or the execution of other software components in the processor SE. As the link between an application and the device HD1 of a user is established outside the device HD1, that is, in databases IDDB, UPDB, ARDB, this link may easily be re-established for and from another NFC device, in the case of loss, theft, or exchange of device HD1. The cryptograms ED1 and ED2 allow for the authentication of the processor SE and the application. Moreover, it should be understood that the except for the establishment of a communication between the device HD1 (of the mobile telephone type) and an application downloading server WSRV, the sequences of steps described above do not require the intervention of a mobile network operator.

It will clearly appear to the skilled person that the present invention is susceptible of diverse implementation variations and applications. In particular, the invention is not limited to NFC devices in which the controller NFCC is connected to the processor HP1. Indeed, the controller NFCC and the secure processor SE may be integrated in a chip associated with a mobile telephone by any known mechanical means (sticker, mobile telephone covering). For example, in FIG. 5, the transmission of data necessary for the execution of an application by the processor HP1 may be transmitted to the processor HP1 by the intermediary of server ASRV connected to the device POI. The application in the processor HP1 may also be manually launched by the user.

The steps of downloading and of installing an application in the processor HP1 are also not necessary. These operations may in fact be performed during the installation of the operating system MOS in the processor HP1. The NFC device HD1 may also be supplied to a user with a certain number of applications already installed in the processor HP1.

Moreover, depending upon the application ("Reader Applications," "Card Applications"), the device HD1 may establish a contactless link with an external NFC device (POI) in card mode, in reader mode, or even in "peer-to-peer" mode. Thus, execution of the sequence of steps of FIG. 6 is not necessarily performed in a synchronous manner. Indeed, in particular in the case where the device POI is a contactless integrated circuit, steps S61 and S70 may be done in deferred manners when the device POI can establish a communication with the application server ASRV.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of executing a secure application in a Near Field Communication (NFC) device, the method comprising:
    establishing a contactless link between a first NFC device and a second NFC device, the first NFC device comprising a secure processor,
    transmitting a secure processor identifier identifying the secure processor of the first NFC device from the first NFC device to the second NFC device over the contactless link,
    transmitting an application identifier from the second NFC device to the first NFC device over the contactless link,
    transmitting secure processor authentication data for authenticating the secure processor of the first NFC device, from the secure processor to the second NFC device over the contactless link,
    transmitting the secure processor authentication data from the second NFC device to an application server,
    transmitting the secure processor authentication data and application authentication data for authenticating an application corresponding to the application identifier, from the application server to an authentication server, and
    in the authentication server, verifying the secure processor authentication data and the application authentication data and authorizing the first and second NFC devices to execute the application only if the secure processor and the application are authenticated by way of the secure processor authentication data and the application authentication data.

2. The method according to claim 1, wherein:
    the first NFC device transmits to the authentication server an application installation request comprising an application identifier of an application to install and the secure processor authentication data,
    the authentication server verifies the secure processor authentication data, and if the secure processor is authenticated, transmits to the first NFC device an application download address, and
    the first NFC device downloads the application from the received download address and installs the downloaded application.

3. The method according to claim 2, wherein, after the installation of the application, the first NFC device informs the authentication server of the installation of the application by supplying thereto the identifier of the installed application and the secure processor authentication data, and
    the authentication server verifies the secure processor authentication data, and if the secure processor is authenticated, the authentication server stores the application identifier in association with the identifier of the secure processor of the first NFC device.

4. The method according to claim 3, wherein the authentication server does not transmit to the first NFC device an application download address if the application identifier is already stored in association with the identifier of the secure processor of the first NFC device.

5. The method according to claim 1, wherein the authentication server does not authorize the execution of the application by the first and second NFC devices if the application identifier is not stored in association with the identifier of the secure processor of the first NFC device.

6. The method according to claim 1, wherein the secure processor authentication data comprises the identifier of the secure processor and a first cryptogram calculated by the secure processor by applying a cryptographic calculation using a secret key stored by the secure processor to the identifier of the secure processor.

7. The method according to claim 1, wherein the application authentication data comprises the identifier of the secure processor, the application identifier, and a second cryptogram calculated by the application server by applying a cryptographic calculation using a secret key specific to the application identifier.

8. The method according to claim 7, wherein the second cryptogram is calculated by applying the cryptographic calculation to the application identifier and to the first cryptogram.

9. The method according to claim 6, wherein the first cryptogram is calculated by a symmetric encryption algorithm using a secret key, or an asymmetric encryption algorithm using a private key, or a hashing function applied to the data to encrypt and to the secret key.

10. The method according to claim 6, wherein the verification of the first cryptogram and/or second cryptogram is performed by recalculating the cryptogram from the same data and by using an encryption key accessible to the authentication server.

11. A system for executing a secure application in a Near Field Communication NFC) device, comprising:
a first NFC device comprising an NFC component to establish a contactless communication with another NFC device, and a secure processor connected to the NFC component,
a second NFC device connected to an application server to execute an application with another NFC device, and
an authentication server accessible to the application server and to the first NFC device, the system being configured to:
establish a contactless link between the first NFC device and the second NFC device;
transmit an identifier of the secure processor of the first NFC device from the first NFC device to the second NFC device over the contactless link;
transmit an application identifier from the second NFC device to the first NFC device over the contactless link;
transmit secure processor authentication data for authenticating the secure processor of the first NFC device, from the first NFC device to the second NFC device over the contactless link;
transmit the secure processor authentication data from the second NFC device to an application server;
transmit the secure processor authentication data and application authentication data for authenticating an application corresponding to the application identifier from the application server to an authentication server; and
in the authentication server, verify the secure processor authentication data and the application authentication data and authorize the first and second NFC devices to execute the application only if the secure processor and the application are authenticated by way of the secure processor authentication data and the application authentication data.

12. The system according to claim 11, wherein:
the first NFC device is configured to transmit to the authentication server an application installation request comprising an application identifier of an application to install and the secure processor authentication data, receive a download address of the application, download the application from the received download address and install the downloaded application, and
the authentication server is configured to verify the secure processor authentication data, and if the secure processor is authenticated, transmit to the first NFC device the application download address.

13. The system according to claim 12, wherein:
the first NFC device is configured to inform the authentication server of the installation of the application after the installation of the application, by supplying to the authentication server the identifier of the installed application and the secure processor authentication data, and
the authentication server is configured to verify the secure processor authentication data, and if the secure processor is authenticated, the authentication server stores the application identifier in association with the identifier of the secure processor of the first NFC device.

14. The system according to claim 13, wherein the authentication server is configured to not transmit to the first NFC device an application download address if the application identifier is already stored in association with the identifier of the secure processor of the first NFC device.

15. The system according to claim 13, wherein the authentication server is configured to refuse the execution of the application by the first and second NFC devices if the application identifier is not stored in association with the identifier of the secure processor of the first NFC device.

16. The system according to claim 11, wherein the secure processor authentication data comprises the identifier of the secure processor and a first cryptogram calculated by the secure processor by applying a cryptographic calculation using a secret key stored by the secure processor to the identifier of the secure processor.

17. The system according to claim 16, wherein the application authentication data comprises the identifier of the secure processor, the application identifier, and a second cryptogram calculated by the application server by applying a cryptographic calculation using a secret key specific to the application to the application identifier.

18. The system according to claim 17, wherein the second cryptogram is calculated by applying the cryptographic calculation to the application identifier and to the first cryptogram.

19. The system according to claim 16, wherein the first and/or the second cryptograms are calculated with the aid of a symmetric encryption algorithm using a secret key, or of an asymmetric encryption algorithm using a private key, or of a hashing function applied to the data to encrypt and to the secret key.

20. The system according to claim 16, wherein the verification of each of the first and second cryptograms is performed by recalculating the cryptogram from the same data and by using an encryption key accessible to the authentication server.

21. The method according to claim 7, wherein the second cryptogram is calculated by a symmetric encryption algorithm using a secret key, or an asymmetric encryption algorithm using a private key, or a hashing function applied to the data to encrypt and to the secret key.

22. The method according to claim 7, wherein the verification of the second cryptogram is performed by recalculating the second cryptogram from the same data and by using an encryption key accessible to the authentication server.

* * * * *